Dec. 21, 1954  S. C. CARTER  2,697,366
AXLE DRIVE FOR MOTOR VEHICLES
Filed April 14, 1953  2 Sheets-Sheet 1
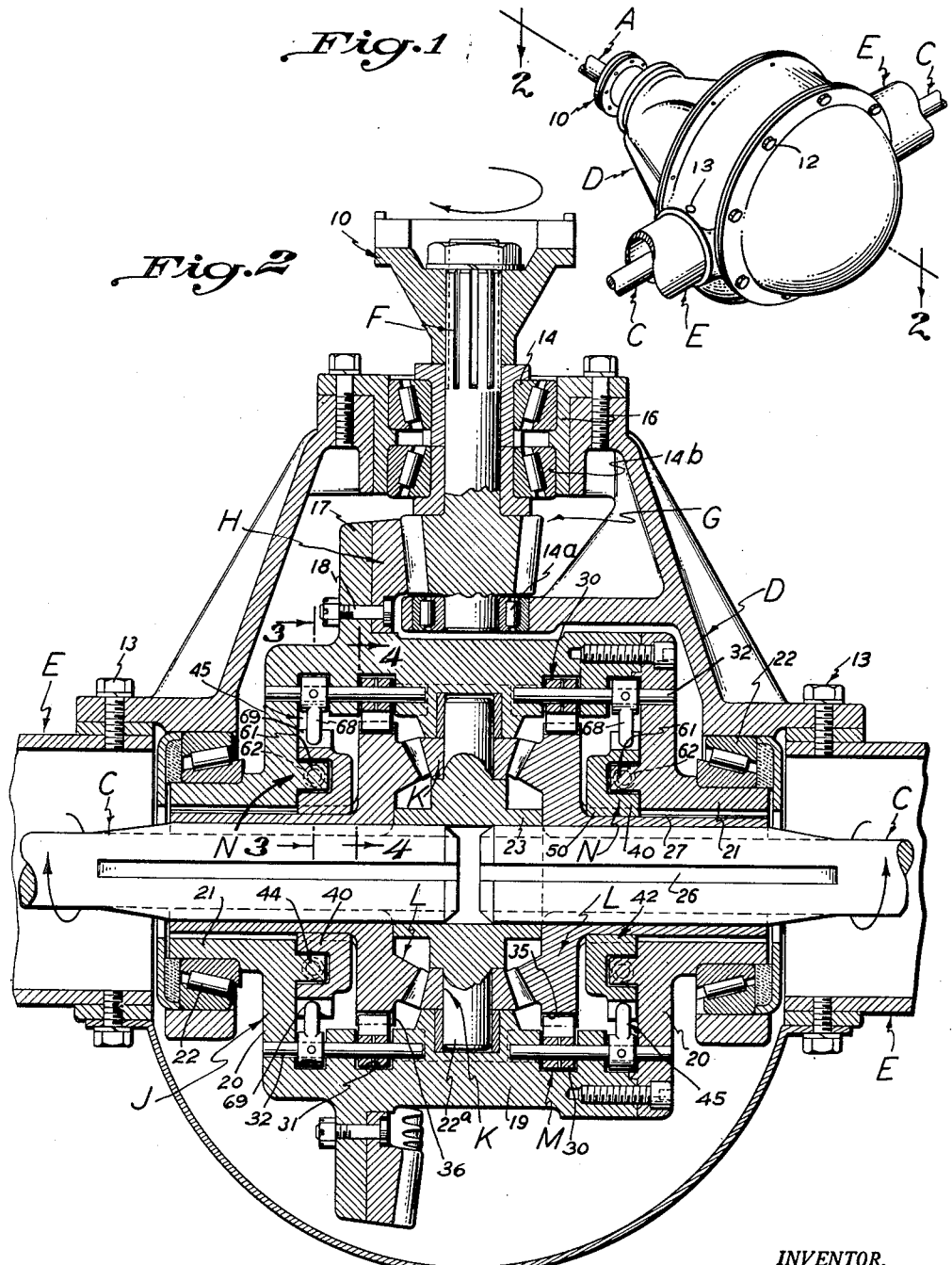
INVENTOR.
Samuel C. Carter
BY
Attorney.

Dec. 21, 1954  S. C. CARTER  2,697,366
AXLE DRIVE FOR MOTOR VEHICLES
Filed April 14, 1953  2 Sheets-Sheet 2
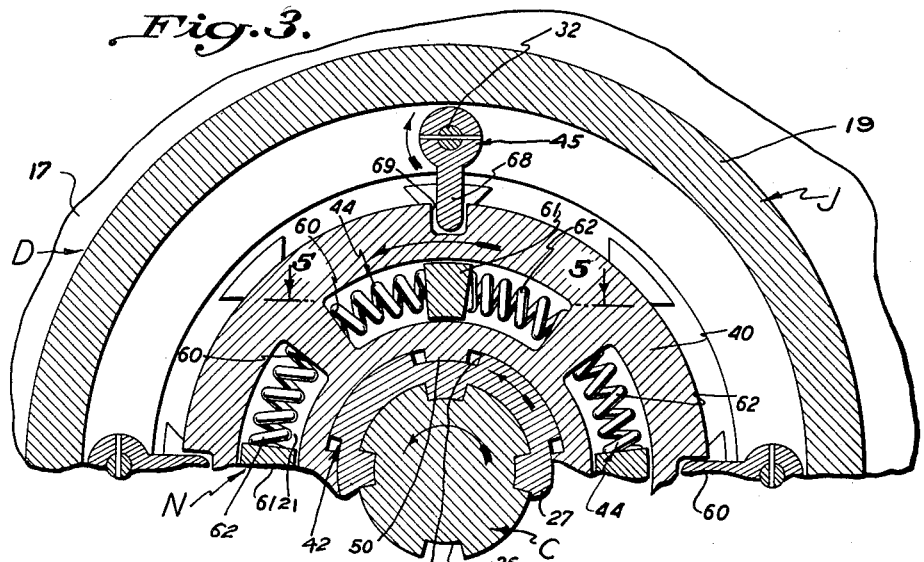
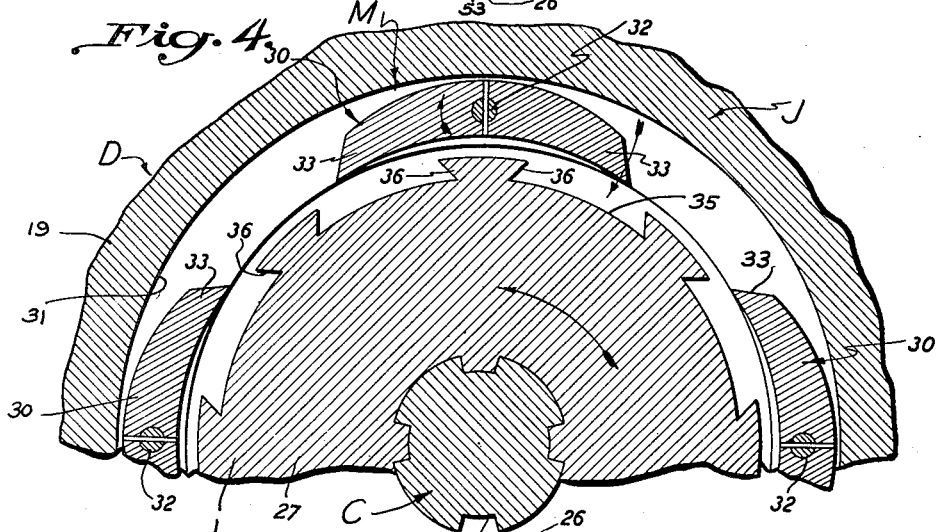
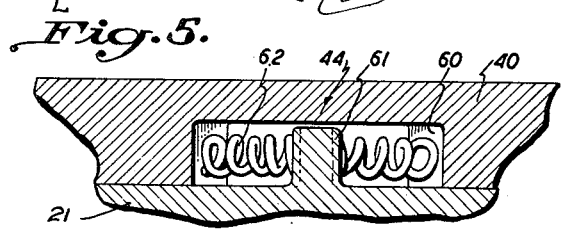
INVENTOR.
Samuel C. Carter
BY
Attorney.

United States Patent Office 2,697,366
Patented Dec. 21, 1954

2,697,366

AXLE DRIVE FOR MOTOR VEHICLES

Samuel C. Carter, Bishop, Calif.

Application April 14, 1953, Serial No. 348,761

9 Claims. (Cl. 74—711)

This invention relates to an axle drive for motor vehicles and it is a general object of the invention to provide a drive connecting a propeller shaft and wheel carrying axle sections so that relative movement between the axle sections is controlled so that the wheels are efficiently driven and so that braking action, gained through compression of the engine driving the propeller shaft is effectively utilized.

It is common to provide the ordinary motor vehicle with an engine operating a propeller shaft and to provide a differential mechanism between the propeller shaft and the axle sections carrying wheels equipped with brake mechanisms. With the ordinary construction, when it is important to drive both wheels as, for instance, on a grade, one wheel may slip or run ahead of the other so that the effective drive is lost or decreased. In other cases, if one drive wheel hits a wet spot or area on a pavement, it may run ahead of the other wheel so that effective drive is lost or diminished. Further, with the ordinary construction, when the vehicle is being checked or braked against the compression of the engine, which action is usually supplemented by means of the brake mechanisms, one wheel may be more effectively checked than the other, or one wheel may run ahead of the other with loss of effective braking action.

It is a general object of this invention to provide a mechanism or drive for connecting a propeller shaft and axle sections so that the operation, or action of the parts, is controlled or limited to the end that effective efficient drive is gained, or dependable efficient braking action is gained, depending upon the manner in which the vehicle is being operated.

It is another object of the invention to provide a mechanism of the general character referred to which is of simple, practical, dependable construction, and which requires but few simple sturdy parts that can be readily incorporated in a construction which is essentially comparable in over-all size and shape to a differential mechanism.

The various objects and features of my invention will be fully understood from the following detailed description of a typical preferred form and application of my invention, throughout which description reference is made to the accompanying drawings, in which:

Fig. 1 is a perspective view illustrating generally the mechanism of the present invention showing it connecting a propeller shaft and two axle sections. Fig. 2 is an enlarged plan section view of the mechanism, being a plan section taken substantially as indicated by line 2—2 on Fig. 1. Fig. 3 is an enlarged detailed section of a part of the mechanism, being a view taken as indicated by line 3—3 on Fig. 2. Fig. 4 is an enlarged detail sectional view of a portion of the mechanism taken substantially as indicated by line 4—4 on Fig. 2, and Fig. 5 is an enlarged sectional view of a portion of the mechanism being a view taken as indicated by line 5—5 on Fig. 3.

The mechanism provided by the present invention is such as to be applicable to various motor vehicles, say, for example, those intended for both commercial use and pleasure, for instance, it can be applied to trucks, passenger vehicles, military vehicles, et cetera. The invention is concerned with a mechanism connecting or providing a drive between the propeller shaft of the vehicle and the axle sections and the illustration of the invention is confined to such parts. It is to be understood that, in practice, the propeller shaft A may be driven from any suitable prime mover or engine and through any suitable drive mechanism and it is to be understood that the axle sections C are like, oppositely disposed, aligned shaft-like elements suitably supported and each driving a wheel of the vehicle.

The mechanism as provided by the present invention includes generally a frame construction made up of housing D and axle covers or sleeves E. A drive shaft F is carried by and enters the housing D and is adapted to be joined to the propeller shaft A by a suitable drive coupling 10. A drive pinion G is provided on shaft F within the housing D and engages and drives a ring gear H on a drum-like gear carrier J, which carrier is rotatable in the housing on an axis concentric with that of the axle sections C. A plurality of planetary pinions K are supported in the carrier J on axes disposed radially of the axis of the carrier. The planetary pinions engage and drive gears L on the shaft sections C. Each gear L is keyed onto a shaft section to, in effect, form a unit.

The parts thus far described and related, as will be hereinafter set forth, are essentially the parts of an ordinary or conventional differential gear mechanism and are the parts with which the present invention is incorporated or to which the invention is applied as shown in the drawings.

The present invention provides generally, means controlling or limiting relative movement between the rotatable gear carrier J and the units formed by the axle sections and the gears L combined therewith. In the construction provided by the present invention there is a ratchet mechanism M cooperatively relating each shaft and its gear L with the carrier J, and these ratchet mechanisms are adapted to operate independently of each other. A control means N is provided for, or in connection with, each ratchet mechanism M.

The housing D of the frame structure may in practice be a simple, sectional, case-like element as shown in the drawings, while the axle sleeves E may be tubular parts joined to opposite sides of the housing and project therefrom. In the particular case illustrated, the housing D includes sections joined by suitable fasteners 12 and the axle sleeves are parts separable from the housing, being normally joined thereto by fasteners 13.

The drive shaft F coupled to propeller shaft A by coupling 10 is carried by anti-friction bearings 14 mounted in housing D and it extends into the housing D to carry the drive pinion G.

The drive pinion G is preferably a bevel pinion with teeth suitably cut or formed thereon, and in the case illustrated it is shown fixed on the inner end of shaft F.

The ring gear H is an annular member supported by carrier J to be concentric with the axis of the carrier and shaft sections C and it is a bevel gear with teeth cooperatively related to those of pinion G. In the particular case illustrated, one part 14$^a$ of the anti-friction bearing means carrying shaft G is mounted within the housing D and the pinion G is mounted between the bearing 14$^a$ and a bearing 14$^b$ in a suitable holder 16 carried by the housing.

The ring gear H is shown mounted on or secured to the carrier J by means of a flange 17 and suitable fasteners 18.

The carrier J is shown as including a tubular body 19 concentric with the axis of the shaft sections C, and end plates 20 carried by and projecting inward from the ends of the body. The ring gear H surrounds the body 19 of the carrier. The end plates 20 are fixed to the ends of the body 19 and have mounting hubs 21 projecting from them and carried by anti-friction bearings 22 supported in the housing D.

With the construction just described, as the shaft F is operated by the propeller shaft A, the pinion G drives the gear H so that the carrier J is rotated about the axis of the shaft sections C.

The planetary pinions K are located within the body 19 of carrier J between the end plates 20 and are circumferentially spaced about the axis of the carrier. The pinions K are supported on trunnions 22$^a$ projecting radially from a central collar 23 that rotatably receives the inner opposite end portions of the shaft sections C, so that these parts of the shaft sections are freely rotatable relative to each other. The planetary pinions K are bevel pinions or gears meshed with correspondingly beveled gears L. There is one gear L on each shaft section C to which section it is secured by means of one or more drive keys 26 or the like. The gears L are opposed so that they engage diametrically opposite sides of the planetary pinions K and being on the independently rotatable shaft sections C they are free to turn relative to each other. In the construction illustrated each gear L has a hub portion 27, tubular in form, rotatably supported in a hub part 21 of the carrier J, and rotatably supported on the inner end portion of its corresponding or complementary shaft section C.

The mechanism thus far described includes parts or elements essential to complete a planetary gear mechanism such as is commonly employed between a propeller shaft A and sections C.

The ratchet mechanisms M provided by the present invention cooperatively relate the carrier J and the units made up of the shaft sections C and the gears L fixed thereon. There is one ratchet mechanism M for, or related to, each unit made up of a shaft section C and gear L, and these mechanisms are independently operable.

In the form of the invention illustrated each mechanism M includes a pawl 30 supported in a recess 31 provided in the interior of the carrier body 19. The pawl 30 is preferably fixed on a pin 32 rotatably carried by the body 19 on an axis parallel with that of the carrier and laterally offset therefrom. The pawl 30 may, if the mechanism M is to operate only when the wheels of the vehicle are being driven from the propeller shaft, include but one jaw 33. If the mechanism is to operate only when the propeller shaft A is driven from the wheels of the vehicle, it may include but one jaw 33 disposed opposite to the one first mentioned. In the case illustrated, the pawl 30 is shown with two jaws extending or facing in opposite directions.

The mechanism M includes teeth or shoulders on a gear L cooperatively related to the pawl 30 and in the case illustrated the gear L related to the mechanism M has a round peripheral portion 35 provided with a plurality of teeth or shoulders 36. Some of the shoulders 36 face in one direction, while others face in the opposite direction. The mechanism M is such that if the pawl 30 is in a neutral or unactuated position, the jaw 33 thereof will be clear of the peripheral portion 35 of the gear L, whereas when the pawl is operated one way or the other, one jaw 33 or the other will cooperatively engage a shoulder 36 on the peripheral portion 35 of the gear L, thus establishing a driving engagement between the gear L and carrier J.

It is to be understood that in practice each gear mechanism may involve a plurality of pawls carried on pins 32 and circumferentially spaced in the carrier J as circumstances may require.

A control means N as provided by the present invention is combined with or related to each ratchet mechanism M and in the case illustrated it includes a control ring 40 within the body 19 of the carrier J and within the hub portion 21 of an end plate 20 in which element it is rotatable, and confined between the said plate 20 and the gear L with which the mechanism M cooperates. A drive means 42 is provided between the sleeve 27 attached to the gear L and the ring 40, a means 44 normally yieldingly holds the control ring 40 in a neutral or unactuated position and a means 45 operatively connects the drive ring and the pawl carrying pin 32 of mechanism M. The control ring 40 is free or floats in the mechanism 19 at the position hereinabove described, except as it is limited by the other elements of the control means.

The drive means 42 of control means N includes a lug 50 projecting radially inward from the ring 40 and into a recess or notch 53 in the hub 27 which is keyed to and therefore, in effect, a part of the shaft. Through this construction relative rotation can occur between the ring 40 and the section with which it is cooperatively related; however, after a predetermined amount of such relative movement, the part of the shaft engages one side or the other of lug 50, whereupon the ring 40 is operated or moved relative to the hub 21.

The means 44 of the control means N normally yieldingly holds the ring 40 in a neutral or unactuated position as shown in the drawings. In the case illustrated the means 44 includes spaced opposed shoulders 60 on or in the ring 40, a lug 61 projecting from the end plate 20 of carrier J to be between the shoulders 60 and helical compression springs 62 under compression between the lug 61 and the shoulders 60 as clearly shown in Fig. 3 of the drawings.

With the means 44 included in the construction one or the other of the springs 62 is compressed when the ring 40 is actuated relative to its supporting hub 21, as hereinabove described.

The means 45 operatively connecting the control ring 40 and the pawl 30 includes an arm 68 fixed on the pin 32 and projecting radially inward therefrom to enter a notch 69 in the periphery of the ring 40. These parts are related so that when the ring 40 is rotated in one direction or the other relative to the carrier J the pawl-carrying pin 32 is rotated and the pawl is operated from its neutral position. If the pawl has two jaws 33 as above described, one or the other of these jaws will, in the case just described, be engaged with a shoulder 36.

It is to be understood that in carrying out the present invention several units of means 44 can be applied to or combined with each ring 40 and that several mechanisms M may be under control of a single ring 40.

With the mechanism provided by the present invention, if the drive shaft F is operated from the propeller shaft A, the shaft sections C will be driven through the planetary mechanism so that they operate at the same speed or at substantially the same speed as is normally the case of a planetary mechanism. If one of the shaft sections C tends or starts to run ahead of the other, for instance, if the wheel on one shaft section slips or runs ahead for any reason whatsoever, the ratchet mechanisms or mechanisms M related to that shaft section through the gear L located thereon is engaged following operation of the control means governing that ratchet mechanism or those mechanisms, so that over-running action is checked or positively stopped.

If the vehicle is being braked, for instance, if braking action is being communicated through the shaft sections C to the propeller shaft A so that braking action is gained through the engine of the vehicle and one wheel and its corresponding shaft section slips or tends to run ahead of the other, the ratchet mechanism or mechanisms M related to that shaft section through the gear L thereon will be engaged through action of its related control means, checking excessive over-running so that both wheels continue to be effective and serve to maintain satisfactory braking action.

Having described only a typical preferred form and application of my invention, I do not wish to limit or restrict myself to the specific details herein set forth, but wish to reserve to myself any variations or modifications that may appear to those skilled in the art and fall within the scope of the following claims.

Having described my invention, I claim:

1. A drive adapted to connect the propeller shaft and drive wheels of a motor vehicle including, a housing, a drive shaft extending into the housing and adapted to be coupled to the propeller shaft, aligned axle sections entering the housing from opposite sides, a carrier rotatable in the housing on an axis concentric with that of the axle sections, a constantly engaged drive between the drive shaft and carrier, a planetary pinion carried by the carrier, a gear on each axle section, the gears being engaged with the pinion at opposite sides thereof, mechanisms cooperatively relating the carrier and the gears and each including a pawl carried by the carrier, each pawl being adapted to engage one of the gears, and control means for each mechanism each related to one axle section and responsive to over-running thereof to engage the pawl related to that section with that section to check over-running, each control means including a ring concentric with the carrier, means whereby the ring is operated from the axle section to which that control means is related, means normally yieldingly holding the ring in an unactuated position, and means connecting the ring and the gear related to the last mentioned axle section.

2. A drive adapted to connect the propeller shaft and drive wheels of a motor vehicle including, a housing, a drive shaft extending into the housing and adapted to be coupled to the propeller shaft, aligned axle sections entering the housing from opposite sides, a carrier rotatable in the housing on an axis concentric with that of the axle sections, a constantly engaged drive between the drive shaft and carrier, a planetary pinion carried by the carrier, a gear on each axle section, the gears being engaged with the pinion at opposite sides thereof, mechanisms cooperatively relating the carrier and the gears and each including a pawl carried by the carrier, each pawl being adapted to engage one of the gears, and control means for each mechanism each related to one axle section and responsive to over-running thereof to engage the pawl related to that section with that section to check over-running, each control means including a ring concentric with and adapted to turn relative to the carrier, means whereby the ring is operated from the axle section to which that control means is related, including a loose driving connection between the ring and axle sections, means normally yieldingly holding the ring in an unactuated position relative to the carrier, and means connecting the ring and the gear related to the last mentioned axle section.

3. A drive adapted to connect the propeller shaft and drive wheels of a motor vehicle including, a housing, a drive shaft extending into the housing and adapted to be coupled to the propeller shaft, aligned axle sections entering the housing from opposite sides, a carrier rotatable in the housing on an axis concentric with that of the axle sections, a constantly engaged drive between the drive shaft and carrier, a planetary pinion carried by the carrier, a gear on each axle section, the gears being engaged with the pinion at opposite sides thereof, mechanisms cooperatively relating the carrier and the gears and each including a pawl carried by the carrier, each pawl being adapted to engage one of the gears, and control means for each mechanism each related to one axle section and responsive to over-running thereof to engage the pawl related to that section with that section to check over-running, each control means including a ring concentric with the carrier, means whereby the ring is operated from the axle section to which that control means is related, means normally yieldingly holding the ring in an unactuated position, and means connecting the ring and the gear related to the last mentioned axle section, including an arm fixed relative to the pawl and cooperatively engaged with the ring.

4. A drive adapted to connect the propeller shaft and drive wheels of a motor vehicle including, a housing, a drive shaft extending into the housing and adapted to be coupled to the propeller shaft, aligned axle sections entering the housing from opposite sides, a carrier rotatable in the housing on an axis concentric with that of the axle sections, a constantly engaged drive between the drive shaft and a carrier, a planetary pinion carried by the carrier, a gear on each axle section, the gears being engaged with the pinion at opposite sides thereof, mechanisms cooperatively relating the carrier and the gears and each including a pawl carried by the carrier, each pawl being adapted to engage one of the gears, and control means for each mechanism each related to one axle section and responsive to over-running thereof to engage the pawl related to that section with that section to check over-running, each control means including a notched ring concentric with and adapted to turn relative to the carrier, means whereby the ring is operated from the axle section to which that control means is related, including a loose driving connection between the ring and axle sections, means normally yieldingly holding the ring in an unactuated position relative to the carrier, and means connecting the ring and the gear related to the last mentioned axle section including, an arm fixed relative to the pawl and engaged in the notch of the ring.

5. A drive adapted to connect the propeller shaft and drive wheels of a motor vehicle including, a housing, a drive shaft extending into the housing and adapted to be coupled to the propeller shaft, aligned axle sections entering the housing from opposite sides, a carrier rotatable in the housing on an axis concentric with that of the axle sections, a constantly engaged drive between the drive shaft and carrier, a planetary pinion carried by the carrier, a gear on each axle section, the gears being engaged with the pinion at opposite sides thereof, mechanisms cooperatively relating the carrier and the gears and each including a pawl carried by the carrier, each pawl being adapted to engage one of the gears, and control means for each mechanism each related to one axle section and responsive to over-running thereof to engage the pawl related to that section with that section to check over-running, each control means including a ring concentric with the carrier, means whereby the ring is operated from the axle section to which that control means is related, including a notched lug on the ring projecting inward therefrom and a key on the shaft section loosely received in the notch of the lug, means normally yielding holding the ring in an unactuated position, and means connecting the ring and the gear related to the last mentioned axle section.

6. A drive adapted to connect the propeller shaft and drive wheels of a motor vehicle including, a housing, a drive shaft extending into the housing and adapted to be coupled to the propeller shaft, aligned axle sections entering the housing from opposite sides, a carrier rotatable in the housing on an axis concentric with that of the axle sections, a constantly engaged drive between the drive shaft and carrier, a planetary pinion carried by the carrier, a gear on each axle section, the gears being engaged with the pinion at opposite sides thereof, mechanisms cooperatively relating the carrier and the gears and each including a pawl carried by the carrier, each pawl being adapted to engage one of the gears, and control means for each mechanism each related to one axle section and responsive to over-running thereof to engage the pawl related to that section with that section to check over-running, each control means including a ring concentric with the carrier, means whereby the ring is operated from the axle section to which that control means is related, means normally yieldingly holding the ring in an unactuated position, including opposed shoulders on the ring, a fixed part on the carrier and compression springs at opposite sides of said part and engaging said shoulders, and means connecting the ring and the gear related to the last mentioned axle section.

7. A drive adapted to connect the propeller shaft and drive wheels of a motor vehicle including, a housing, a drive shaft extending into the housing and adapted to be coupled to the propeller shaft, aligned axle sections entering the housing from opposite sides, a carrier rotatable in the housing on an axis concentric with that of the axle sections, a constantly engaged drive between the drive shaft and carrier, a planetary pinion carried by the carrier, a gear on each axle section, the gears being engaged with the pinion at opposite sides thereof, each gear having a periphery with oppositely faced shoulders, mechanisms cooperatively relating the carrier and the gears and each including a pawl carried by the carrier, each pawl having oppositely faced jaws adapted to engage one of the gears, and control means for each mechanism each including an annular spring loaded control ring related to one axle section and responsive to over-running thereof to releasably engage one of the jaws of the pawl related to that section with a shoulder on the gear of that section to check over-running.

8. A drive adapted to connect the propeller shaft and drive wheels of a motor vehicle including, a housing, a drive shaft extending into the housing and adapted to be coupled to the propeller shaft, aligned axle sections entering the housing from opposite sides, a carrier rotatable in the housing on an axis concentric with that of the axle sections and having a tubular body and end plates at the ends of the body and supported in the housing, a constantly engaged drive between the drive shaft and the exterior of the carrier, a planetary pinion carried by the carrier at the interior thereof, a gear on each axle section and within the body of the carrier, the gears being engaged with the pinion at opposite sides thereof, mechanisms within the body of the carrier cooperatively relating the carrier and the gears and each including a pawl pivotally carried by the carrier, each pawl being adapted to releasably engage one of the gears, and spring loaded control means for each mechanism each including an annular springloaded control ring cooperatively related to the housing and to one axle section and responsive to over-running thereof to engage the pawl related to that section with that section to check over-running.

9. A drive adapted to connect the propeller shaft and drive wheels of a motor vehicle including, a housing, a drive shaft extending into the housing and adapted to be coupled to the propeller shaft, aligned axle sections entering the housing from opposite sides, a carrier rotatable in the housing on an axis concentric with that of the axle sections and having a tubular body and end plates at the ends of the body and supported in the housing, a constantly engaged drive between the drive shaft and the exterior of the carrier, a planetary pinion carried by the carrier at the interior thereof, a gear on each axle section and within the body of the carrier, the gears being engaged with the pinion at opposite sides thereof, mechanisms within the body of the carrier cooperatively relating the carrier and the gears and each including a pawl carried by the carrier at the interior of the body, each pawl being adapted to engage one of the gears, and control means for each mechanism and located within the carrier and each related to one axle section and responsive to over-running thereof to engage the pawl related to that section with that section to check over-running.

References Cited in the file of this patent

UNITED STATES PATENTS

| Number | Name | Date |
|---|---|---|
| 1,262,562 | Reiche | Apr. 9, 1918 |
| 1,404,836 | Crawford | Jan. 31, 1922 |
| 1,437,453 | Sheckler | Dec. 5, 1922 |
| 1,481,889 | Carhart | Jan. 29, 1924 |
| 2,234,591 | Fitzner | Mar. 11, 1941 |
| 2,531,819 | Lewis | Nov. 28, 1950 |

FOREIGN PATENTS

| Number | Country | Date |
|---|---|---|
| 607,356 | Great Britain | Aug. 30, 1948 |
| 700,272 | Germany | Dec. 17, 1940 |